C. J. SOLOMON.
ADJUSTABLE FIELD ROLLER.
APPLICATION FILED FEB. 18, 1909.
934,942.
Patented Sept. 21, 1909.
3 SHEETS—SHEET 1.
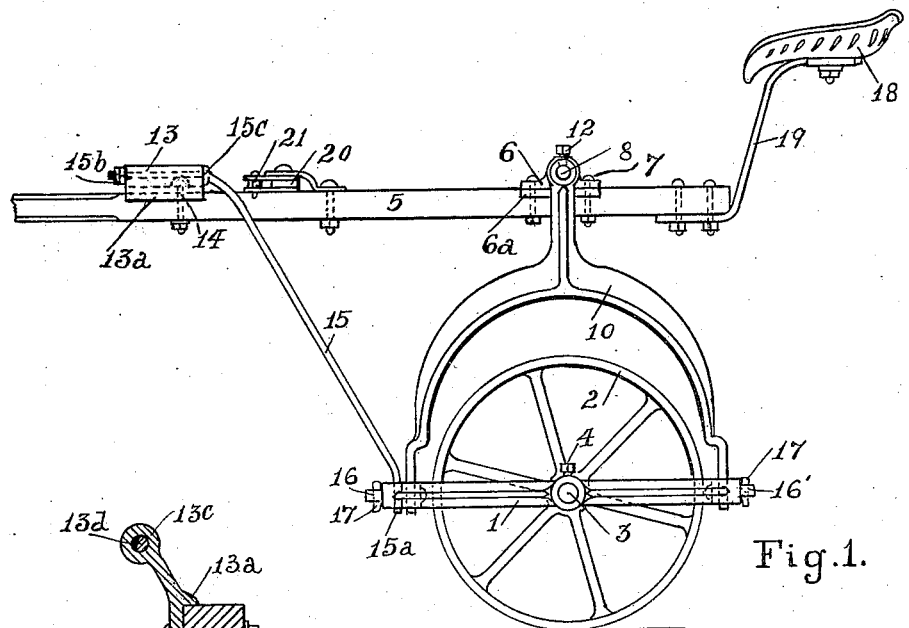
Witnesses.
A. R. Livingston.
Victor Georg
Inventor.
Cicero J. Solomon.
By Atty N. DuBois.

C. J. SOLOMON.
ADJUSTABLE FIELD ROLLER.
APPLICATION FILED FEB. 18, 1909.

934,942.

Patented Sept. 21, 1909.
3 SHEETS—SHEET 3.

Witnesses.
A. R. Livingston
Victor Georg.

Inventor
Cicero J. Solomon,
By Atty N. DuBois.

UNITED STATES PATENT OFFICE.

CICERO J. SOLOMON, OF PALMYRA, ILLINOIS.

ADJUSTABLE FIELD-ROLLER.

934,942.

Specification of Letters Patent. Patented Sept. 21, 1909.

Application filed February 18, 1909. Serial No. 478,587.

*To all whom it may concern:*

Be it known that I, CICERO J. SOLOMON, a citizen of the United States, residing at Palmyra, in the county of Macoupin and State of Illinois, have invented a certain new and useful Adjustable Field-Roller, of which the following is such a full, clear, and exact description as will enable others skilled in the art to which it appertains to make and use my said invention.

This invention relates to field-rollers, and the purposes of the invention are to provide an apparatus of the class described equipped with separately adjustable rollers adapted to roll the ground between the rows of growing crops, such as corn, and so constructed and arranged that the rollers may be adjusted horizontally toward or away from each other; may be adjusted to incline away from each other so as to roll both sides of a lister furrow or other depression; and may be adjusted to incline toward each other to roll both sides of a ridge or raised row; and to provide other new and useful features of construction.

My invention is shown in the annexed drawings, to which reference is hereby made and is hereinafter particularly described and finally recited in the claims.

Figure 3:
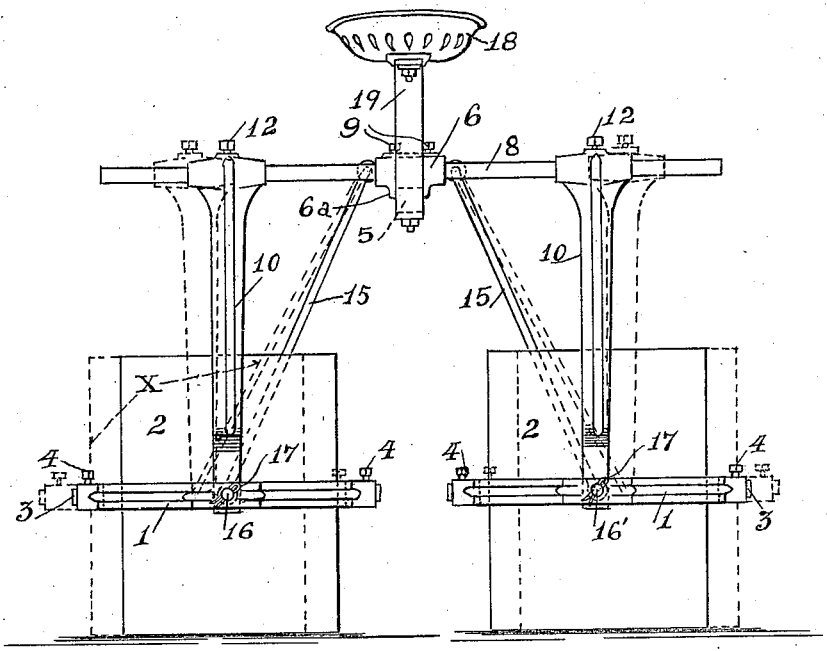
Figure 4:
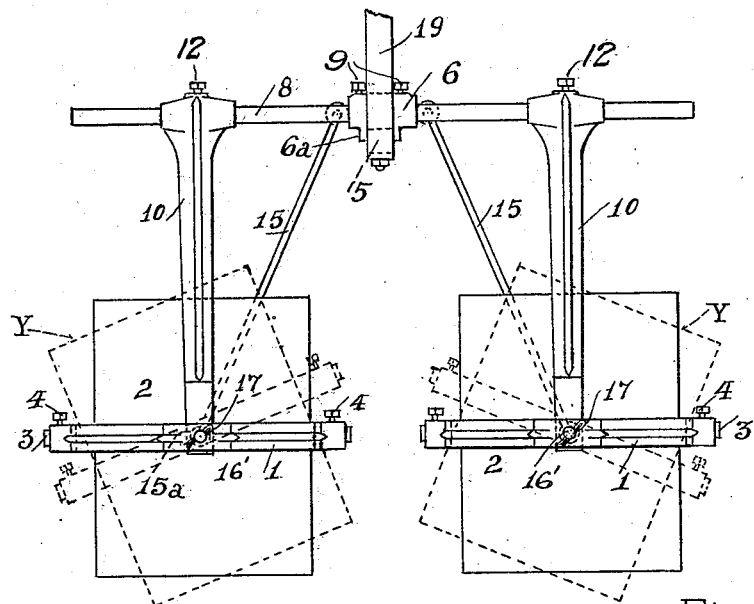
Figure 5:
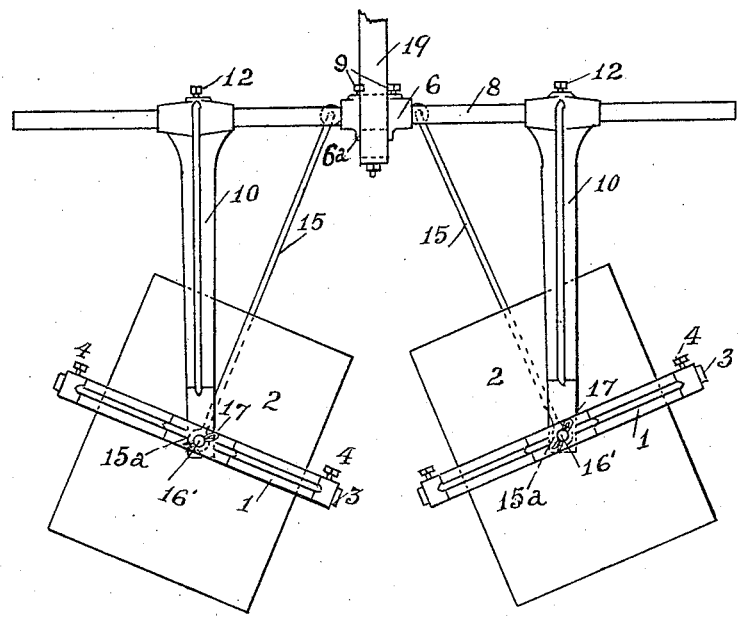

Figures 1 and 2 are respectively a side elevation and a top plan of the field-roller; Fig. 3 is a rear elevation of the field-roller, and shows in dotted lines the position of the parts when the rollers are adjusted outwardly for greater width between the rows; Fig. 4 is a rear elevation, showing in dotted lines the position of the parts when the rollers are running on a ridge or raised row; Fig. 5 is a rear elevation showing the position of the parts when the rollers are running in a furrow or depressed row; and Fig. 6 is an enlarged vertical section on the line V. V. of Fig. 2.

Similar reference numerals and characters designate like parts in the several views.

The implement comprises frames 1, and rollers 2 mounted to turn within the frames respectively. The frames 1 are preferably of cast iron and approximately rectangular in form, but frames of other suitable material or form may be used. Shafts 3 extend across the frames 1 respectively and through the hubs of the rollers 2, and are secured by set screws 4; and the rollers turn on said shafts. The frames 1 have openings $1^a$ and $1^b$ accommodating the lower ends of the arches 10, as hereinafter described. A tongue 5 occupies a horizontal position intermediate of and above the frames 1. A block 6 is secured on the tongue 5 by bolts 7, and has downwardly extending flanges $6^a$ which prevent lateral movement of the block on the tongue. A shaft 8 extends horizontally through the block 6 and is held in place thereon by set screws 9. Set screws 12 serve to secure the arches 10 on the shaft 8. By loosening the set screws 12 the arches may be slid on the shaft to change the position of the arches relative to each other, and when the arches have been adjusted as desired the set screws may be tightened to hold them in the position in which they are placed.

A brace-plate 13 fits on top of the tongue 5 and has downwardly extending flanges $13^a$ preventing lateral movement of the brace-plate on the tongue, and a longitudinal slot $13^b$ accommodating a bolt 14 connecting the brace-plate with the tongue; it also has longitudinal cylindrical bosses $13^c$ accommodating the upper horizontal parts of the combined braces and draft-bars 15. When the nut on the bolt 14 is loosened, the brace-plate may be slid longitudinally on the tongue to an extent limited by the length of the slot $13^b$, and when the brace-plate has been set in the desired position the nut may be tightened to hold the plate in place. The braces 15 have at their lower ends eyes $15^a$ adapted to receive bolts to connect the braces with the frames 1. The upper parts of the braces 15 are horizontal and fit in the holes $13^d$ of the bosses $13^c$ and have enlargements $15^c$, preventing longitudinal movement of the braces in the holes $13^d$. Nuts $15^b$ on the upper ends of the braces prevent them from pulling out of the holes $13^d$. The lower parts of the rear members of the arches 10 extend downward through the openings $1^b$ respectively, and the front members of the arches extend downward through the openings $1^a$ respectively. Bolts 16 extend transversely through the frame and through the ends of the front arch-members and the eye $15^a$ of the braces 15, occupying the opening $1^a$, and connect the lower ends of the braces and the lower ends of the front members of the arches with the frame, and bolts $16'$ extend through the frames 1 and through the rear members of the arches, occupying the openings $1^b$, and connect the lower ends of the arches with the frames. Cotter pins 17 secure the bolts 16 and 16'. A double-tree 20 is pivotally connected with the tongue 5, and is provided with swingle-tree 21, to which the horses are hitched in the usual manner to propel the roller. A seat 18 is supported on a spring standard 19 which is fixed on the tongue 5.

In practice the rollers may be adjusted horizontally toward or away from each other, according to the width between the rows on which they are operating. The widths between the rows of corn or other growing crops, vary according to circumstances. Common widths between rows are, say three feet six inches, or three feet eight inches. If the implement is set to operate upon rows three feet six inches apart and it is desired to change it to operate upon rows three feet eight inches apart, the set screws 12 and the nut on the bolt 14 will be loosened. The arches 10 will then each be slid one inch outward on the shaft 8 and this sliding of the arches outward will cause the frames 1 to slide away from each other the same distance, and will cause the brace-plate 13 to slide rearward upon the tongue 5 a distance sufficient to accommodate the braces 15 to the changed position of the frames 1, as clearly shown by dotted lines X in Figs. 1 and 3; and the set screws 12 and the nut on the bolt 14 will then be tightened to secure the arches and the brace-plate in the position in which they are set. In operating upon level ground the rollers will be horizontal, and their axes will be in line with each other.

From the foregoing it will be seen that by reason of the frames 1 having a pivotal connection with the arches 10, the rollers 2 automatically adjust themselves to the ground upon which they are rolling.

In case the implement is being used to roll both slopes of a ridge or raised row, the rollers will assume the position indicated by dotted lines Y, in Fig. 4; and in case the implement is being used to roll both slopes of a furrow or depressed row the rollers will assume the position shown in Fig. 5.

Having fully described my invention, what I claim as new and desire to secure by Letters Patent is:

1. The combination of a tongue, a horizontal shaft fixed on said tongue, arches adjustable on said horizontal shaft, roller-frames pivotally connected with said arches, and rollers mounted to turn within said roller-frames.

2. The combination of a tongue, a horizontal shaft fixed on said tongue, arches adjustable on said horizontal shaft, roller-frames pivotally connected with said arches, a brace-plate adjustable on said tongue, braces having a swivel connection with said brace-plate and a pivotal connection with said roller frames, and rollers mounted to turn within said roller-frames.

3. Roller-frames each having hubs adapted to receive a shaft, and openings adapted to accommodate the downwardly extending members of an arch; shafts fitting in the hubs of said frames; set screws securing said shafts; rollers turning on said shafts respectively; arches having downwardly extending members within the openings of said frames; a shaft rigidly connecting said arches; a tongue on which said shaft is fixed; a brace-block on said tongue; braces having swivel connection with said brace-block and having eyes fitting within the openings of said roller-frames; and connecting devices pivotally connecting said arches and said braces with said frames.

In witness whereof I have hereunto signed my name at Palmyra, Illinois, this 5th day of Sept., 1908.

CICERO J. SOLOMON.

Witnesses:
 J. R. CUNDALL,
 JAMES ETTES.